: 3,256,236
Patented June 14, 1966

3,256,236
CARBON-POLYOLEFIN COMPOSITIONS AND PROCESS FOR MAKING SAME
Daniel F. Herman, Orange, and Joseph A. Orsino, Mountain Lakes, N.J., assignors to National Lead Company, New York, N.Y., a corporation of New Jersey
No Drawing. Filed Mar. 30, 1960, Ser. No. 18,483
12 Claims. (Cl. 260—41)

This application is a continuation-in-part of our application Serial No. 736,686, filed May 21, 1958 now abandoned.

This invention relates to a process of polymerizing olefinic materials directly on the surfaces of carbon particles, to the products obtained thereby, to processes of forming useful articles from such products and to the product resulting from such forming operations.

More particularly, this invention is concerned with a simple, inexpensive process of forming a polyolefin such as polyethylene, polypropylene, polyisoprene or the like, directly on particles of carbon so that each particle is substantially enclosed in a shell of the polyolefin that is bonded or attached thereto. The invention is concerned also with a variety of products that can be made with polyolefin encased carbon materials thus prepared.

Many procedures have been proposed heretofore for incorporating carbon in polymerized olefinic materials with the object of modifying or altering the properties of the polymerized materials, such as, to make the polymerized material less susceptible to the deleterious effects of sunlight. To a great extent, the carbon black has been added in only minor amounts and has been added to the olefinic material after polymerization. Thus, after the olefinic material is polymerized, the carbon material has been added by liquefying the polymerized olefinic material with heat or a solvent and stirring the carbon material into the liquefied polymer. Such procedure results in degradation of the polymer and does not provide an even and uniform dispersion of the carbon. This is particularly true where any substantial loading of the polymerized material with carbon black is attempted.

Another process employed for the addition of carbon to polymerized olefin materials employs a mill of the type conventionally used in the rubber industry. In such process the polymerized olefin and carbon are added separately to the heated rolls of the mill and the carbon is kneaded or blended into the polymer. This process, likewise, results in degradation of the polymer and does not give an even and uniform dispersion of the carbon.

In addition to the difficulties in adding carbon to the polymer by either the liquid or mechanical process, the more rigid and highly crystalline polymers of this class do not readily lend themselves to either of these procedures even at the relatively low loading percentages in which these processes are more commonly employed.

One of the objects of this invention is to provide a process wherein small particles of carbon may be easily and inexpensively enclosed in individual shells of a polyolefin plastic anchored securely to the carbon particle. This permits more efficient use of the polymer, more even and uniform distribution of the carbon and makes new kinds of physical structures easy to fabricate.

Another object of the invention is to produce a product consisting of granules of polyolefinic plastic each containing particles of carbon substantially encased therein, which product is readily free flowing but can very easily be cast, extruded, molded or otherwise formed into sheets, films, tubes or articles having a wide variety of shapes and capable of many different uses and applications.

Another object of the invention is to form cast, molded or extruded objects varying widely in density and porosity in which carbon particles are evenly and uniformly dispersed throughout the object.

In the instant invention, polyolefin plastic is formed or polymerized directly onto the surface of carbon particles to form a shell around each of the particles. Each particle maintains its individual identity throughout the process, there being little, if any, interconnecting or agglomerating of the particles during the polymerizing process. Thus, each of the granular carbon particles is surrounded by an individual shell of polymer, the product formed by the process being a granular material having a particle size substantially proportional to the original size of the carbon particles. Since each carbon particle is encased in a shell of polymer, due to the inherent properties of the polymer, the product formed is free-flowing and may be readily poured.

The carbon particles may be of any desired size, even as small as sub-micron sizes, and are treated with a catalytic agent in accordance with the invention to form active sites on the particles. The olefin is then added to the catalytically treated carbon particles and the monomer is polymerized at the surface of each of the particles and formed thereon. The formation of the polymer on the carbon black particles is substantially uniform, all of the particles being encased in shells of the polymer, there being no perceptible quantity of free polymer formed.

Carbon materials are commercially marketed in grades, usually of a substantially uniform particle size. In the practice of the invention, any particular grade may be employed and, if desired to attain certain properties, different grades may be blended. Particularly, in the smaller sizes, individual particles of the untreated carbon material tend to agglomerate and form small clusters of individual particles. These clusters or agglomerates are, in and of themselves, relatively small. In the practice of the instant invention it has been noted that, where such clusters or agglomerated particles occur in the material before treatment, each cluster or agglomerate is encased as a unit in a shell of the polymer. In addition to forming a shell around the agglomerate, the polymer also forms in the interstices within the agglomerate. This formation in the interstices tends to spread or separate the agglomerate, particularly in the higher polymer percentages. It is to be understood, as used herein, the term particle includes clusters and agglomerates of carbon particles where such clusters and agglomerates are found in the untreated carbon material.

The process of encasing individual particles of carbon in shells of polyolefin plastic polymerized in situ thereon is preferably carried out by the use of what is known as an organometallic-transition metal catalyst system. The components of such a catalyst system, as will be understood by those skilled in the polymer art, react when mixed together to produce a substance or substances highly active as a polymerization initiator for the low molecular weight aliphatic 1-olefins.

Any of the aliphatic 1-olefins having less than 6 carbon atoms may be polymerized in accordance with our invention. These include the simplest 1-olefins such as ethylene, propylene, butene-1 and the like and also di-olefins such as butadiene-1,3 and isoprene. These 1-olefins may be used to form homopolymers, or mixtures of them may be polymerized together to form various copolymers. In addition, other compounds which are knofn to copolymerize with these 1-olefins to form useful products may be employed in combination therewith. We prefer to use ethylene or plopylene which have the outstanding advantages of being gases at ordinary temperatures, of being relatively inexpensive and available in large quantities, and of producing polymers of high molecular weight having very desirable properties.

Catalyst systems which have been found useful in the process of this invention include any system having two or more components which, when mixed together, react to form a material that initiates the polymerization of the 1-olefins, and which have at least one component that will become fixed or attached in some way on the carbon material when brought in contact therewith prior to the complete reaction of such component with the other components of the system. In general, we have found that two component systems which are particularly suitable are those in which one component is an organometallic reagent such as an alkyl or aryl compound of one of the metals lithium, sodium, potassium, magnesium, calcium, zinc, cadmium, boron, or aluminum, and the other component is a transition metal compound such as a halide or ester of titanium, zirconium, vanadium or chromium. Other similar catalysts systems, containing two or more components, can be used as will be apparent to those skilled in the art of producing polyolefins.

We have discovered that it is important in our process to treat the carbon particles with one of the components of the catalyst system while such component is capable of being fixed on or absorbed by the carbon particles and before these catalyst components have been mixed together long enough to complete their reaction with each other. The catalyst components may be mixed together before addition to the carbon particles, but if this premixing of catalyst takes place several hours or more prior to addition to the carbon particles, separate particles of polymer are formed and a substantial portion of the carbon particles are not enclosed or encased in shells of the polymer.

In the practice of the invention we prefer to treat the carbon particles with either one of the components of the catalyst system and then add the other component or components of the catalyst system to the treated carbon particles. The polymer may then be formed by polymerization on the carbon particles as soon as the catalyst components have had an opportunity to react with each other.

We have also found it desirable to avoid the use of too large a proportion of catalyst in excess of the amount needed to form active polymerization sites on the carbon particles. If too large an amount of catalyst is used in relation to the amount of carbon treated, a portion at least of the polymer is formed independently of the carbon and not in the form of shells around the carbon particles.

The catalyst components appear to become fixed on the carbon particles either physically or by chemical reaction before the polymerization is started, although we do not wish to be bound by any particular theory of operation.

A wide variety of carbon materials such as channel black, furnace black, thermal black, lampblack, bone black, wood charcoal, coal dust, graphite, activated carbon, and coke breeze may be employed in the process. The physical properties, such as strength, electrical resistivity, and the like, of the polyolefin encased carbon particles and the articles formed therefrom will, to an appreciable extent, depend on the type, size and physical properties of the carbon material.

The material formed in the process of the instant invention is a granular, free-flowing powder, each particle of which has a center or nucleus of carbon encased in a shell of polymer. The polymer surrounds the carbon. This is evidenced by the fact that when the encased particles are spread and pressed on a white surface, such as paper, there is no smudging of free carbon. Little, if any, polymer separate from the carbon can be found in the material.

One of the distinctive features of the products obtained by this process is that the individual particles can be substantially encased in individual shells of polymer without appreciable agglomeration of the particles during the polymerization. The proportion of polyolefin which encases the particles may be varied over a wide range without sticking the particles together. At the end of the polymerization reaction the product is composed of particles proportional to the size of the original carbon particles, the increase in size of the particle, of couse, depending on the amount of polymer encased thereon. After the carbon particles are enclosed in shells of polyolefin, the particles are very free-flowing and may be handled without any tendency of the treated particles to stick together. Thus, unlike the untreated carbon which tends to compact and agglomerate, the treated particles of this process maintain their individual particle identity and will flow freely.

The treated particles may be molded, cast or extruded in any conventional manner. Molding, casting or extruding may be accomplished with a solvent or heat and may be accompanied by pressure. In most instances, particularly where strong dense products are desired, it is preferred to form the product with heat and pressure. Temperatures as high as or somewhat above the crystalline melting point of the polymer coating may be employed. Where maximum tensile strength in the finished article and density are of importance, it is preferred to mold the material at a temperature at or slightly above the crystalline melting point of the polymer coating. With a polyethylene coating, a heating temperature as high as 310° F. or even higher may be employed to obtain maximum tensile strength, while with products coated with polypropylene, other polyolefins or copolymers, the temperature of heating may be somewhat higher or lower depending on the crystalline melting point of the polymer coating.

Since each treated particle contains a center or nucleus of carbon surrounded by a case or shell of polymer the molded product comprises carbon particles suspended in a matrix of polymer. This matrix may be highly porous or may be dense and compact depending upon the amount of temperature and pressure employed in forming the product. Thus, where the treated particles are heated only for a short period of time to the crystalline temperature without the application of pressure, a porous product is formed. On the other hand, where the product is heated to the crystalline temperature and, while at the crystalline temperature, pressure is applied to the product, a dense and compact product is formed. In either event, the product formed consists essentially of individual particles of carbon suspended in a matrix of polymer. Due to the initial uniform distribution of the carbon particles in the granular powder, the carbon particles are dispersed uniformly throughout the molded product.

In forming molded articles from the treated particles of the instant invention, it is not necessary to melt all of the polymer. The polymer is merely softened and, in its softened condition, where desired, compacted with pressure. Thus, lower molding and extruding temperatures are required. This, of course, results in a more stable and uniform product to say nothing of the advantages attained by the even and uniform distribution of the carbon particles in the finished product.

The molding materials of our invention can be used to form laminated structures in which the powder is fused, or pressed and fused, about wire, solid metal or any desired core material to produce products for many and varied uses. Sheets or other articles made according to our invention can be readily heat-sealed or welded to each other or to other heat-sealing materials. Where desired, the products may be attached by the use of solvents rather than heat.

One simple and convenient way of carrying out the process and producing the product of the invention is by the slurry method in which the carbon particles are suspended in a suitable liquid medium, such as an organic liquid, which does not react with either the carbon or the polymer to be formed thereon. The carbon particles may be treated with one of the catalyst components before or after it is placed in the suspending liquid. The other catalyst component is then brought into contact with the carbon or the two catalytic components may then be added to the suspending liquid simultaneously with the carbon particles. The slurry of catalyst treated carbon material in the organic liquid, after the second component of the catalyst has been added, is placed in a closed reaction vessel and the monomer is fed into the vessel at a suitable rate while maintaining the slurry in agitation. Provisions should be made to control the temperature of the reaction vessel and the reaction should be carried out under reasonably anhydrous conditions. As polymerization proceeds, the slurry becomes thicker and reaction is stopped at any desired stage depending upon how much of the polymer is to be formed. The slurry can then be removed from the reaction vessel and pressed or filtered to remove the free organic liquid and then washed in water, methanol or other materials which easily dissolve out the bulk of the catalyst residue. Minor amounts of additives of the type conventionally employed with polymers, such as anti-oxidants, coloring pigments and the like, may be added to the carbon particles before treatment or may be added during polymerization or thereafter.

The polymerization reaction may be carried out at atmospheric pressure or higher pressure if desired, and over a wide range of temperature. Ordinarily, the polymerization proceeds rapidly at atmospheric pressure and at a temperature between about 20° C. and about 100° C. The amount of polymer formed will vary with the time of the polymerization reaction, the particular catalyst used and the particular monomer or monomers being polymerized. Useful products are obtained by forming polymer on the carbon particles in amounts from about 1% to about 95%, based on the total weight of the carbon-polymer composition. Polymer encased carbon particles wherein the polymer content is less than 5% of the total weight of the carbon-polymer composition have been found to be particularly useful for pigmenting paint and the like while particles having a higher polymer content, for example 10% to 80%, have been found to be particularly useful in pressure molding.

In practicing the process of the invention and in order to assure that the polymer forms on the carbon article and does not form as free polymer in the composition, active catalytic sites should be formed on the carbon particles and the formation of sites other than on the particles should be avoided. One means which has been found effective in maintaining the formation of active sites on the carbon particles and, at the same time, avoiding the formation of free sites, has been through the proportioning of the catalytic components with the carbon particles. We have discovered that by treating the carbon particles with one of the components of the catalyst system in the proportion of not substantially less than 0.06 and not substantially more than 2.4 millimoles of catalyst component to each gram of carbon, the formation of active sites can be effectively limited to the carbon particles. Where substantial quantities of polymer are to be formed on the carbon particles it is preferred to limit the treatment of the carbon particle to not substantially more than 1.0 millimole of catalyst component per gram of carbon.

The proportioning between the components of the catalyst system may be varied depending on the particular components employed and the properties desired in the polymer. For most purposes and with most components, a molar ratio between the components of 1 to 1 has been found satisfactory. By varying the molar proportioning between the catalyst components as is well known in the polymer art, the molecular properties of the polymer formed on the carbon particles may be varied.

In order that the process of the invention may be better understood, the following examples are given:

EXAMPLE 1

70 gm. of pelletized furnace process carbon black having an average particle size of 80 millimicrons, sold by Godfrey L. Cabot, Inc. as Sterling-S, was vacuum dried and dispersed in 1400 cc. dry toluene. Nitrogen was passed through for one hour. $TiCl_4$ (0.0158 mole) was introduced at 35° C. and allowed to react with the carbon black for one-half hour. Triethylaluminum (0.0158 mole) was then added and the temperature gradually raised as ethylene was introduced. Absorption of ethylene gas was rapid and the reaction was interrupted after six hours when 63.9% polyethylene formed. The temperature of the reaction ranged from 40–76° C. The reaction was killed with 280 cc. alcohol and filtered. The product was washed twice by slurrying in 1400 cc. methyl alcohol, filtered and dried. The material had a fine, homogeneous appearance and did not smudge. The material was molded into a strong, flexible disc when pressed at 175° C. and 3000 p.s.i. Fibers or filaments were drawn from 10% solution of the product in hot xylol.

EXAMPLE 2

70 gm. of vacuum dried powdered furnace process carbon black having an average particle size of 80 millimicrons, sold by Godfrey L. Cabot, Inc. as Sterling-R, was dispersed in 1400 cc. dry toluene and nitrogen passed through for one hour while agitating with a high speed disperator. $TiCl_4$ (.06 mole) was added to the slurry and reaction allowed for one-half hour at 40° C. Triethylaluminum (.03 mole) was then added and ethylene gas introduced. The polymerization reaction was continued for one hour at 45–54° C. A product containing 8% polymer formed. The material was incorporated into a paint formulation with a 52–R 13 type alkyd vehicle by pebble milling. 6 parts of the carbon black-polyethylene, 72 parts Aroplaz 1266 (medium oil soya alkyd), 2 parts 24% Pb naphthenate, 0.8 part 6% cobalt drier, 0.5 part antiskinning agent and 25 parts of Sovasol were charged in a pebble mill and ground for twenty-four hours. Films were cast which were smooth and homogeneous, had good hiding properties and showed improved water and acid resistance when compared to a similar formulation with uncoated carbon black. Taber abrasion tests gave 183 cycles as against 172 cycles for the uncoated black. Shear hardness showed 43% increase over the uncoated black and tensile strength showed approximately 50% improvement in aged films.

EXAMPLE 3

70 gm. of channel black having an average particle size of 21 millimicrons, sold by Godfrey L. Cabot, Inc., as Elf-O, was dispersed in 1400 cc. xylol and azeotroped to dryness. After nitrogen was passed through for one hour, carbon black was reacted with .0158 mole $TiCl_4$ for five minutes at 35° C. Triethylaluminum (.0158 mole) was then added and the polymerization of ethylene started. The temperature was maintained at 62–65° C. for three and three-quarter hours. The reaction was stopped when 46% polymer formed. The product was washed in alcohol and dried. The material did not smudge. The product was molded into strong flexible discs.

EXAMPLE 4

70 gm. of lampblack, sold by C. K. Williams and Co. as Super Jet lampblack, was vacuum dried and dispersed in 1400 cc. dry toluene. After passing nitrogen through for one hour, the carbon black was reacted with 0.0158 mole $TiCl_4$ for five minutes at 35° C. Triethylaluminum (.0158 mole) was then added and polymerization started. The temperature was maintained at 62–70° C. and the reaction was interrupted when 49.3% polymer formed. The product was washed in alcohol and dried. The material did not smudge and molded into strong flexible discs.

EXAMPLE 5

70 gm. of bone black all of which passed through a 325 mesh screen, sold by Columbian Carbon Co. as Ivo #100, was reacted as in Example 4 and encapsulated with 45% polyethylene. The product showed no smudging and molded into strong flexible discs.

EXAMPLE 6

50 gm. of powdered coal having an average particle size of 25 microns was dispersed in 3600 cc. toluene and azeotroped to dryness. Nitrogen was passed through for one hour and the black was treated with 60 mM. $TiCl_4$ for twenty-five minutes at 35° C. 30 mM. triethylaluminum was then added and polymerization of ethylene started. The temperature was maintained at 65–75° C. After one and one-half hours, 73.4% polymer formed having a reduced specific viscosity of 5.46. The material molded into a smooth, homogeneous strong sheet. The material did not smudge. Microscopic examination shows that all the powdered coal particles are encapsulated. The aggregate size of the polyethylene is 150µ.

EXAMPLE 7

70 gm. of coke breeze all of which passed through a 30 mesh screen was dispersed in 1400 cc. heptane and azeotroped to dryness. After nitrogen was passed through for one hour the black was treated with .0158 mole $TiCl_4$ for seven minutes at 50° C. Triethylaluminum (.0158 mole) was then added and the polymerization of ethylene started. In three hours 50% polymer formed. The product was washed in alcohol and dried. A homogeneous grey product was obtained.

EXAMPLE 8

70 gm. of activated wood charcoal having an average particle size of 70 microns, sold by Atlas Powder Co. as Darco G-60, was dispersed in 1400 cc. toluene and azeotroped to dryness. Nitrogen was passed through for one hour and the black then treated with 0.0158 mole $TiCl_4$ for five minutes at 35° C. Triethylaluminum (.0158 mole) was then added and polymerization of ethylene started. The temperature was maintained at 65–73° C. After three hours 51.7% polymer formed. The product after cleaning in alcohol and drying had a fine soft texture and showed no smudging. The coated product had a deep jet black color contrasting to the grey color of coke breeze which was encapsulated with approximately the same percentage of polyethylene.

EXAMPLE 9

A 3 liter flask was charged under nitrogen with 2000 ml. of dry toluene and 33 g. of dry pelletized semi-reinforcing furnace process gas black having an average particle size of 80 millimicrons, sold by Godfrey L. Cabot, Inc., as Sterling-S. 20 mM. of $ZrCl_4$ was added with agitation at room temperature and the system was saturated with ethylene. 30 mM. of 3 N MeMgBr in ethyl ether was added ten minutes later at 20° C., followed after another twenty minutes by 15 mM. of MeMgBr at 40° C. Ethylene was introduced as fast as it was used up and polymerized for three hours at 50° C. The product was filtered, washed several times with methanol, and dried. The yield was 75 g. of polyethylene coated carbon black containing 56% polyethylene.

EXAMPLE 10

Example 9 was repeated with 60 g. of powdered semi-reinforcing furnace process black having an average particle size of 80 millimicrons, sold by Godfrey L. Cabot, Inc., as Sterling-R, except that 160 mM. of finely dispersed sodium was added to the catalyst as soon as the 50° C. polymerization temperature was reached. The yield after five hours was 190 g. of polyethylene coated carbon black containing 68.4% polyethylene.

EXAMPLE 11

Example 9 was repeated with 120 g. of pelletized furnace process oil black having an average particle size of 45.2 millimicrons. The yield after one and one-half hours was 137 g. of polyethylene coated carbon black containing 12.4% polyethylene.

EXAMPLE 12

To a moisture-free room temperature mixture of 30 gm. of powdered furnace process carbon black as in Example 1 in 1000 ml. toluene was added 1.1 ml. $TiCl_4$ (.01 mole) and 1.23 gm. Zn $(C_2H_5)_2$ (.01 mole) as 6.4 ml. solution in heptane. Ethylene was passed into the mixture at an initial temperature of 25° C. Polymerization of monomer began immediately and the temperature rose exothermically to 51° C. as approximately 20 l. of gas was absorbed in three hours. Carbon black-polyethylene product was recovered by methanol and methanol-water washings and then drying. The 60 gm. of product was a fine powder which would not be wet by water and which was non-smudging.

EXAMPLE 13

To a 2 l. flask equipped with stirrer, gas inlet tube, reflux condenser and thermometer, and containing a water-free slurry of 30 gm. carbon black in 1000 ml. toluene was added 2.17 gm. anhydrous, powdered $CrCl_3$ (.013 mole) at 80° C. The mixture was held at this temperature for three hours under a nitrogen atmosphere. After cooling to 65° C., 16.1 ml. of a heptane solution containing 3.76 gm. $AlEt_3$ (.033 mole) was added, mixed at 65° C. for three-quarters of an hour and then allowed to cool. After storing for eighty-eight hours at room temperature, ethylene was passed into the flask at an initial temperature of 9.5° C. Absorption of monomer began and proceeded slowly but steadily for eight hours. During this time the temperature rose to 33° C. and the reactant gradually thickened. Fifty-four grams of product were recovered by washing with methanol, methanolic HCl, water and then drying. It was a granular powder which was hydrophobic and did not smudge.

EXAMPLES 14–23 INCL.

These examples show the effect of carbon loading, catalyst ratio, catalyst concentration, and addition on polymer yield, molecular weight, polymer-carbon ratio, and melt index.

In these examples a 5 liter flask was charged under nitrogen with 3600 ml. of dry toluene and the given amount of dry thermal process gas black having an average particle size of 472 millimicrons. The $TiCl_4$ was added at room temperature and the mixture was agitated for five minutes. $AlEt_3$ was then added at 30° C. and followed by ethylene and in some cases by a sulfur containing molecular weight regulator. Ethylene was passed in as fast as it was used up and the mixture was heated to the 65° C. polymerization temperature. After completion the products were filtered, washed several times in methanol, and dried. Reduced specific viscosity (RSV) was determined on 0.1% solutions in Decalin at 140° C. Melt index was determined at 190° C. and 3 kg./cm.² pressure.

|  | 14 | 15 | 16 | 17 | 18 | 19 | 20 | 21 | 22 | 23 |
|---|---|---|---|---|---|---|---|---|---|---|
| Carbon black in g | 600 | 105 | 118 | 60 | 60 | 60 | 30 | 30 | 30 | 30 |
| TiCl$_4$ in mM | 40 | 36 | 50 | 60 | 78 | 60 | 60 | 60 | 72 | 72 |
| AlEt$_3$ in mM | 20 | 20 | 50 | 60 | 78 | 60 | 40 | 40 | 40 | 40 |
| Catalyst ratio | 2:1 | 1.8:1 | 1:1 | 1:1 | 1:1 | 1:1 | 1.5:1 | 1.5:1 | 1.8:1 | 1.8:1 |
| Sulfur compound in mM |  |  | 1 4 |  |  | 2 6 |  | 2 4 |  | 2 4 |
| PE Yield in g | 140 | 267 | 338 | 240 | 240 | 240 | 153 | 154 | 180 | 174 |
| RSV | 2.0 | 4.1 | 5.7 | 6.2 | 4.4 | 4.3 | 7.6 | 4.4 | 6.4 | 4.3 |
| Percent PE in Product | 19 | 71.8 | 74.1 | 80 | 80 | 80 | 83.6 | 83.7 | 85.7 | 85.3 |
| Melt Index | 0.00 | 0.03 | 0.01 | 0.00 | 0.02 | 0.02 | 0.00 | 0.02 | 0.00 | 0.02 |

1 Didecyl thioether.
2 Lauryl mercaptan.

Carbon black loading affects the TiCl$_4$-AlEt$_3$ catalyst and the properties of the products. At high carbon loadings different ratios of TiCl$_4$-AlEt$_3$ produce normal results: molecular weights of the polymers are reduced when the ratio is changed from 1:1 to 2:1 TiCl$_4$-AlEt$_3$. But high carbon loadings limit the amount of polymer coating that can be produced and this results often in poor flow properties (melt index) even when the molecular weight of the polymer coating is relatively low. High polymer contents can be obtained only at lower carbon loadings. At low carbon loading the effect of catalyst ratios is reversed, i.e., 1.8:1 and 1.5:1 TiCl$_3$-AlEt$_3$ produce higher molecular weights than the 1:1 ratio. Here the molecular weight can be lowered by the use of molecular weight regulating additives, such as lauryl mercaptan, or by increasing the catalyst concentration.

EXAMPLE 24

One and a quarter liters of dry toluene and 50 gms. of carbon black as in Example 2 which had been extracted with toluene prior to use were placed in a stainless steel autoclave of 3.8 l. capacity. The mixture was heated with stirring and 250 ml. of distillate were removed under a nitrogen flow to dry out the system. After cooling to room temperature with a continuing excess flow of nitrogen, 3 gm. TiCl$_4$ (.01575 mole) was added followed by 45.5 ml. of heptane solution containing 10.8 gms. (.0545 mole) tri-isobutyl aluminum. The autoclave was evacuated and charged with propylene. Polymerization was carried out for approximately twenty hours during which period a maximum pressure of 117 p.s.i. and maximum temperature of 92° C. were attained. The thick, gelled product was thinned with toluene and the solids were concentrated by centrifuging. These solids were washed twice with toluene and five times with methanol. Upon drying, 101.7 gm. of carbon black-polypropylene product was obtained containing approximately 50% polymer. It does not smudge nor is it wetted by water. From the toluene washes, 76.8 gm. of light gray colored soluble polymer was recovered.

EXAMPLE 25

Maintaining a nitrogen atmosphere, a slurry of 50 gms. carbon black as in Example 2 in 1200 ml. toluene was dehydrated in a stirring autoclave by removing 260 ml. of distillate. The reaction product of titanium tetrachloride and aluminum, reacted in accordance with U.S. patent application Serial No. 731,682, in an amount containing .025 gm. atom Ti was added and stirred at room temperature for one-half hour followed by 35 ml. heptane solution containing 7.1 gm. (.0625 mole) AlEt$_3$. Propylene was admitted and polymerization was carried out for three hours under maximum conditions of 100 p.s.i. and 80° C. The crude product was extracted three times with toluene, twice with methanol and dried. The resulting 172 gm. of carbon black-propylene product was non-smudging.

EXAMPLE 26

Into a 500 ml. 3 neck flask equipped with a stirrer, condenser, gas inlet and a Dean-Stark trap was placed 25 g. of carbon black as in Example 2 together with 300 ml. of toluene. The mixture was refluxed for two and one-half hours and 110 ml. of a toluene-water mixture was removed. The remaining slurry was transferred in a nitrogen atmosphere to a dried 500 ml. pressure vessel, 0.02 M of ground TiCl$_3$ added, the vessel shaken vigorously for several minutes and then 0.05 M AlEt$_3$ was added. The vessel was placed on a Parr shaker, sealed, flushed with propylene heated to 56° C. and pressurized to 50 p.s.i. Heating at 56–62° C. was maintained for two and one-quarter hours with frequent injection of propylene to maintain the pressure at 50 p.s.i. At the end of the time period the vessel was opened, the contents filtered, washed with methanol and dried. The product weighed 58 g. and consisted of 57% polypropylene coated on the carbon black.

EXAMPLE 27

Into a 1 liter 3 neck flask equipped with a stirrer, condenser gas inlet and a Dean-Stark trap there was placed 15 g. of carbon black together with 420 ml. of n-heptane. The mixture was refluxed for two hours and 95 ml. of a heptane-water mixture was removed. The remaining slurry was cooled to 35° C. and in a nitrogen atmosphere then was added 0.052 M of TiCl$_4$ and 0.122 M of AlEt$_3$. The temperature was raised and butene-1 gas was passed into the mixture with stirring. The mixture was heated for three hours at 58–64° C. while butene-1 gas was passed in at a rate of about 600 ml./min. At the end of the period, the viscous black mixture was removed, diluted with 4 liters of heptane and filtered. The black solids were washed with methanol, filtered and dried. The product weighed 31.2 g. and consisted of 50% polybutene-1 coated on the carbon black.

EXAMPLE 28

Three and four-tenths grams butyl titanate (.01 mole) were added to a moisture-free slurry of 950 ml. toluene and 30 gms. carbon black. The mixture was heated and 25 ml. distillate removed. After cooling to room temperature under nitrogen, 2.5 gm. phenyl lithium (.03 mole), as a dispersion in 41 ml. n-heptane, was added and ethylene was passed over the stirred mixture. Absorption of monomer began and continued slowly for six and one-half hours. The temperature ranged from 26° to 100° C. Recovery of product through washing with methanol, water and drying gave 32 gms. of a somewhat fibrous material containing approximately 6% polymer. Treatment of a sample with water containing a dispersing agent in an ultra high speed mixer failed to disperse any free carbon black as a colloid. Because of the low polymer content some smudging was apparent.

EXAMPLE 29

To a moisture-free slurry of 30 gms. carbon black in 950 ml. toluene was added 3.2 gm. VCl$_3$ (.02 mole). Heat was applied to remove 25 ml. distillate and while cooling to room temperature, the mixture was saturated with ethylene. At 25° C., 1.1 gm. AlEt$_3$ (.01 mole) was added as a solution in 4.9 ml. n-heptane and ethylene was passed over the rapidly stirred reactants. Absorption of monomer began immediately and was continued for two hours in the temperature range of 28–47° C. at which time the catalyst was deactivated by the addition of 25 ml. methanol. Carbon black-polyethylene product was recovered by filtering, washing with methanol and dilute HCl methanol-water solution, and drying. Sixty gms. of granular powder was obtained. This product contained approximately 50% polyethylene and was non-smudging.

EXAMPLE 30

From a stirred slurry of 25 gm. carbon black as in Example 2 in 600 ml. benzene in a 1000 ml. flask were distilled 150 ml. of distillate for the purpose of removing moisture from the system. While maintaining a nitrogen atmosphere, 1 gm. $TiCl_4$ (.0054 mole) dissolved in 50 ml. dry benzene was added slowly and let stir for one-half hour. To this mixture at room temperature was added 0.62 gm. $Al(C_2H_5)_3$ as an approximately 25% solution in heptane (.0054 mole) and 75 ml. isoprene (50 gm.). The reaction temperature rose exothermically to 31° C. in twelve minutes. Polymerization was carried out for a total of four hours while supplying a small amount of heat which raised the temperature to 73° C. in three hours. It was maintained at 73° C. for the last hour. Product recovered after several benzene extractions and drying weighed 28.4 gm. Thus, from the increase in weight of the carbon black, its polymer content is 12%. It is not wet by water but smudges.

EXAMPLE 31

In a 500 ml. flask, 14 gm. carbon black as in Example 2 and 280 ml. toluene were mixed and then 84 ml. distillate were removed to eliminate moisture. On cooling, the slurry was transferred to a dry, 400 ml. pressure bottle. Under a nitrogen atmosphere, 0.63 gm. $TiCl_3$ (.0041 mole) was added using 84 ml. dry toluene to aid the addition. To this mixture was added 0.46 gm. $Al(C_2H_5)_3$ (.0041 mole) as an approximately 18% solution in heptane. The bottle was attached to a shaker, evacuated three times and refilled with ethylene. Polymerization was carried out maintaining a pressure between 35–40 p.s.i. for four hours and at a maximum temperature of 47° C. The weight of product obtained after several methanol washes and drying was 23.5 gm. This calculates to a 40.5% polyethylene content. It resists wetting by water and smudges slightly.

The product produced by the process has properties substantially different from mechanical mixtures of carbon black and polymer and, in some properties, is similar to the polymer without any carbon black addition. Upon mechanical mixing of carbon black and polymer, some of the properties of the polymer are adversely affected. On the other hand, when the polymer is formed on the carbon black particles in accordance with our invention, little, if any, adverse effect can be observed in the polymer. In fact, some properties of the polymer are improved.

In the higher percentages of polymer loading, for example in products containing about 15% or more by weight of polymer, the material may be readily molded, cast, or extruded into sheets, discs, or the like, or may be extruded into fibers if desired. In lower polymer loading, that is, where the carbon black content is 85% by weight or higher, while the polymer is formed around the carbon particle, the amount of polymer present is insufficient to produce a strong bond when molded or extruded alone by conventional processes. However, such materials have many advantages over carbon alone as an additive for paint, rubber, and the like, where high carbon addition is desired. The relatively thin polymer shells, formed around the particles at these higher carbon loadings, aids in dispersion and bonding of the carbon particles to the material to which the polymer encased carbon is added.

In order to demonstrate some of the differences between the product, as formed in the process of the invention and those formed by mechanical blending, test specimens were prepared under identical conditions and comparative tests were conducted. Samples were prepared of the polymer alone, the polymer with the carbon particles mechanically added, and carbon encased in a shell of polymer in accordance with the teaching of the invention. The samples were prepared as follows:

*Sample A*

POLYMER ALONE

A polymerization vessel was charged under nitrogen with 320 parts of dry toluene and 0.925 part of zirconium tetrachloride. The charge was agitated and saturated with ethylene gas. Two parts of 3 N methyl magnesium bromide in ethyl ether was added at 20° C. and the mixture heated in 20 minutes to 40° C. while passing a slight excess of ethylene through the mixture. At 40° C. heating was discontinued and one part of 3 N methyl magnesium bromide in ethyl ether was added. This started an exothermic polymerization reaction and the absorption of ethylene reached its maximum absorption rate in 10 minutes. The temperature of the reaction was allowed to rise to 50° C. and was maintained there with cooling. When the polymerization rate began to decrease pressure was applied slowly up to a pressure of 90 p.s.i. gauge to maintain a constant polymerization rate. The reaction was completed in five hours and produced 30 parts of high molecular weight polyethylene which was purified by washing in methanol. The polyethylene produced was employed in the comparative tests.

*Sample B*

CARBON BLACK (MEDIUM) AND POLYETHYLENE MECHANICAL MIXTURE 35 parts by weight of medium thermal process black having an average particles size of 472 millimicrons were milled with 65 parts by weight of polyethylene produced in accordance with Sample A. The milling was performed on a 2-roll rubber mill at 310° F. to form a composition having 65 parts by weight of polyethylene and 35 parts by weight of thermal process black.

*Sample C*

CARBON BLACK (FINE) AND POLYETHYLENE MECHANICAL MIXTURE 35 parts by weight of furnace process carbon black having an average particle size of 80 millimicrons were milled with 65 parts by weight of polyethylene produced in accordance with Sample A. The milling was performed on a 2-roll rubber mill at 310° F. to form a composition having 65 parts by weight of polyethylene and 35 parts by weight of furnace process carbon black.

*Sample D*

CARBON BLACK (MEDIUM) AND POLYETHYLENE ENCASED

The process of Sample A was repeated with the exception that 12 parts of dry thermal process black of the type described in Sample B was added to the polymerization vessel with the initial charge of 320 parts of toluene. The process was carried out as described in Sample A and 22.2 parts of ethylene was polymerized on the carbon black particles in five hours in accordance with the teaching of the invention. A fine, homogeneous granular composition having 65 parts by weight of polyethylene and 35 parts by weight of thermal process black was formed.

*Sample E*

CARBON BLACK (FINE) AND POLYETHYLENE ENCASED

The process of Sample A was repeated with the exception that 12 parts of dry furnace process carbon black of the type described in Sample C was added to the polymerization vessel with the initial charge of 320 parts of toluene. The process was carried out as described in Sample A and 22.2 parts of ethylene was polymerized on the carbon black particles in five hours in accordance with the teaching of the invention. A fine, homogeneous granular composition having 65 parts by weight of polyethylene and 35 parts by weight of furnace process carbon black was formed.

*Milling test.*—The various samples were milled on a 2-roll rubber mill at a temperature of 290° F. The materials of Samples D and E, the polyethylene encased carbon particles, fused much more completely, exhibited less lubricity, and left less of a deposit on the rolls, than did the materials of Samples B and C, in which the carbon particles had been mechanically blended. The polyethylene encased carbon particles of Samples D and E were equal in milling processibility to Sample A which contained no carbon. The comparative results of the milling test were as follows:

TABLE I

| Sample | PE/CB Ratio | Milling Time | Lubricity | Deposit | Remarks |
|---|---|---|---|---|---|
| A | 100/— | 15 | Mod+ | Sl | Fusion. |
| B | 65/35 | 12 | Excessive | Sl+ | Incomplete fusion. |
| C | 65/35 | 12 | do | Sl+ | Do. |
| D | 65/35 | 7 | Mod+ | Sl— | Fusion. |
| E | 65/35 | 12 | Mod+ | Sl | Do. |

*Flow test.*—The flow rate of the various samples was measured at 311° C. and the flow in grams per ten minutes was recorded. Both Samples D and E, the polyethylene encased carbon produced according to the invention, exhibited better flow than the respective mechanical mixtures of Samples B and C. As would be expected from the size of the carbon particles employed, Sample A, having no carbon additive, had better flow rate than Sample D containing the larger encased carbon particles; Sample D, in turn, exhibited a better flow rate than Sample E containing the smaller encased carbon particles. The results of this test are as follows:

TABLE II

| Sample | PE/CB | Flow Rate at 311° C. | | |
|---|---|---|---|---|
| | | 3 kg./cm.² | 25 kg./cm.² | 40 kg./cm.² |
| A | 100/— | 0.00 | 0.30 | 1.63 |
| B | 65/35 | 0.00 | 0.06 | 0.23 |
| C | 65/35 | 0.00 | 0.00 | 0.01 |
| D | 65/35 | 0.00 | 0.13 | 2.56 |
| E | 65/35 | 0.00 | 0.01 | 0.09 |

*Tensile strength and elongation.*—When tested at a rate of extension of 2 inches per minute, both Samples D and E containing the carbon particles encased in the polyethylene according to the teachings of the invention showed a higher tensile strength than the materials of Samples B and C containing the mechanically mixed particles. Both of the mechanical mixtures of Samples B and C exhibited greater elongation than Samples D and E of the encased particles. The elongation of Sample D was very close to Sample A having no carbon particles. The results of this test are as follows:

TABLE III

| Sample | PE/CB Ratio | Tensile Strength | | | Elongation | | | |
|---|---|---|---|---|---|---|---|---|
| | | Stress to Yield | Post-Yield Stress | Total Stress | Elong. to Yield | Elong. at Yield Stress | Post-Yield Elong. | Total Elong. |
| A | 100/— | 3,325 | 425 | 3,750 | 10 | 120 | 120 | 240 |
| B | 65/35 | 3,000 | 250 | 3,250 | | 130 | 100 | 230 |
| C | 65/35 | 3,500 | | 3,500 | 5 | 100 | | 100 |
| D | 65/35 | 3,300 | 250 | 3,550 | | 190 | 30 | 220 |
| E | 65/35 | 3,700 | | 3,700 | | 40 | | 40 |

*Tear strength.*—When tested at a rate of extension of 20 inches per minute, both Samples D and C were stronger than the mechanical mixtures of Samples B and C. The results of this test are as follows:

TABLE IV

| Sample | PE/CB Ratio | Tear Strength (lbs./in.) |
|---|---|---|
| A | 100/— | 1,370 |
| B | 65/35 | 1,240 |
| C | 65/35 | 1,230 |
| D | 65/35 | 1,320 |
| E | 65/35 | 1,460 |

*Stiffness in torsion.*—When tested in torsion at 23° C., Sample E was much stiffer than its equivalent mechanical mixture. This evidenced greater or more uniform dispersion of the carbon black in the material encased in accordance with the teachings of the invention. The results are as follows:

TABLE V

| Sample | PE/CB Ratio | Modulus of Elasticity $\times 10^3$ p.s.i. |
|---|---|---|
| A | 100/— | 103 |
| B | 65/35 | 181 |
| C | 65/35 | 164 |
| D | 65/35 | 183 |
| E | 65/35 | 222 |

*Brittleness test.*—The various samples were tested for brittleness pursuant to provisions of ASTM procedure D 746–57T. Samples D and E were both superior to the respective mechanical mixtures. Sample D, like Sample A, did not fail during the test. The results of this test are as follows:

TABLE VI

| Sample | PE/CB Ratio | Brittleness Temperature, ° F. |
|---|---|---|
| A | 100/0 | [1] —110 |
| B | 65/35 | —75 |
| C | 65/35 | —55 |
| D | 65/35 | [1] —110 |
| E | 65/35 | —60 |

[1] Specimens did not fail, limit of equipment.

The differences in physical properties between the material as produced in accordance with the teachings of the instant invention and the material where the carbon particles are mechanically mixed or blended in the polymer are abundantly clear from the foregoing tests. In addition to providing a material through which carbon particles may be finely and uniformly dispersed throughout a molded, cast or extruded product, the material of the invention allows the formation of products having improved physical properties over those produced with an equivalent mechanical mixture. In many instances, the properties attained in the material produced in accordance with the teachings of the invention are vastly superior to properties attainable with mechanical mixtures.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A process for encasing carbon particles in a shell of polymer to form a free-flowing granular material of discrete particles, each of said discrete particles having a carbon center substantially encased in a shell of polymer, said shell being substantially proportional in size to the carbon center contained therein, which comprises treating carbon particles which have been thoroughly dried to a substantially anhydrous state with not substantially less than 0.06 and not substantially more than 2.4 millimoles per carbon particle gram of one component of a multi-component catalyst system the components of which, upon reaction with each other, form active sites of polymerization initiator effective for polymerizing 1-olefins to affix said one component to said particles, reacting the treated carbon particles with the remaining component of the catalyst system to react said one component on said particles with said remaining component of said catalyst system and to form and affix on said particles the active sites of polymerization initiator as said sites are formed by the reaction of said components and, thereafter, polymerizing an aliphatic 1-olefin containing less than 6 carbon atoms on said particles by bringing the catalyst treated particles with said active sites of polymerization initiator formed thereon into contact with said 1-olefin to polymerize said olefin on said carbon particles to form a shell of polymer on each of said particles of carbon, said shells being substantially proportional in size to the carbon particle contained therein.

2. In a process as recited in claim 1 in which said 1-olefin is ethylene.

3. In a process as recited in claim 1 in which said 1-olefin is propylene.

4. In a process as recited in claim 1 in which said 1-olefin is isoprene.

5. A process for treating carbon particles to form a shell of polymer on each particle thereof, said shells of polymer being substantially proportional in size to the carbon particle contained therein, which comprises drying said carbon particles until said particles are substantially anhydrous, forming active sites of polymerization initiator on each of said particles by treating said particles with not substantially less than 0.06 and not substantially more than 2.4 millimoles per carbon particle gram of one component of a multi-component catalyst system the components of which, upon reaction with each other, form an initiator effective at low pressure for polymerizing 1-olefins, reacting the treated carbon particles with the remaining component of said catalyst system to form active sites of polymerization initiator and, after said active sites have been formed, polymerizing an aliphatic 1-olefin on said particles by bringing the catalyst treated particles into contact with said 1-olefin to form a shell of polymer on said particles, said shells being substantially proportional to the carbon particle contained therein.

6. In a process as recited in claim 5, said one component being not substantially less than 0.1 and not substantially more than 1.0 millimole per carbon gram.

7. A process for treating carbon particles to form a shell of polymer on each particle thereof, said shells being substantially proportional to the carbon particle contained therein, which comprises drying said carbon particles until said particles are substantially anhydrous, treating said substantially anhydrous carbon particles with not substantially less than 0.06 and not substantially more than 2.4 millimoles per carbon gram of a reagent selected from the group consisting of alkyl and aryl compounds of one of the metals lithium, sodium, potassium, magnesium, calcium, zinc, cadmium, boron and aluminum, to affix said reagent to said particles, reacting the treated particles with a transition metal compound selected from the group consisting of halides and esters of titanium, zirconium, vanadium and chromium, to react said transition metal compound with the reagent fixed to said particles to form active sites of polymerization initiator and to fix said sites, as they are formed, to said particles and, after said active sites have been fixed to said particles, polymerizing an aliphatic 1-olefin containing less than 6 carbon atoms on said particles by bringing the treated and reacted particles into contact with said olefin to polymerize said olefin on said carbon particles and form a shell of polymer on each of said particles substantially proportional to the carbon contained therein.

8. In a process as recited in claim 7 in which said carbon particles are treated with not substantially less than 0.1 and not substantially more than 1.0 millimole per carbon gram of said reagent.

9. A process for treating carbon particles to form a shell of polymer on each particle thereof, said polymer shells being substantially proportional to the carbon particle therein contained, which comprises drying said carbon particles until said particles are substantially anhydrous, treating said substantially anhydrous carbon particles with not substantially less than 0.06 and not substantially more than 2.4 millimoles per carbon gram of a transition metal compound selected from the group consisting of halides and esters of titanium, zirconium, vanadium and chromium, to affix said transition metal compound to said particles, reacting the treated particles with a reagent selected from the group consisting of alkyl and aryl compounds of one of the metals lithium, sodium, potassium, magnesium, calcium, zinc, cadmium, boron and aluminum, to react said reagent with the transition metal compound fixed to said particles to form active sites of polymerization initiator and to fix said sites, as they are formed, to said particles and, after said active sites have been fixed to said particles, polymerizing an aliphatic 1-olefin containing less than 6 carbon atoms on said particles by bringing the treated and reacted particles into contact with said olefin to polymerize said olefin on said carbon particles and form a shell of polymer on said particles substantially proportional to the carbon contained therein.

10. In a process as recited in claim 9 in which said carbon particles are treated with not substantially less than 0.1 and not substantially more than 1.0 millimole per carbon gram of said transition metal.

11. A process for encasing carbon particles in a shell of polymer to form a free-flowing moldable granular material of discrete particles, each of said discrete particles having a carbon center substantially encased in a shell of polymer, said shell being substantially proportional in size to the carbon center contained therein, which comprises forming a slurry by suspending carbon particles in an organic liquid medium inert to said carbon and the polymer to be formed, azeotroping said slurry until said slurry is substantially anhydrous, treating said anhydrous slurry with not substantially less than 0.06 and not substantially more than 2.4 millimoles per carbon particle gram of one component of a multi-component catalyst system the components of which, upon reaction with each other, form active sites of polymerization initiator effective for polymerizing 1-olefins to affix 1-olefins to said particles, reacting the treated slurry with the remaining component of the catalyst system to react said one component with said remaining component of said catalyst and form and affix on said particles the active sites of polymerization initiator as said sites are formed by the reaction of said components and, thereafter, polymerizing an aliphatic 1-olefin containing less than six carbon atoms on said particles by bringing the catalyst treated slurry into contact with said 1-olefin and polymerizing said olefin on said carbon particles to form a shell of polymer on each of said carbon particles, said shells being substantially proportional in size to the carbon particle contained therein and, after said shells are formed on said particles, removing said liquid medium.

12. A process for encasing carbon particles in a shell of polymer to form a free-flowing granular material of discrete particles, each of said discrete particles having a carbon center substantially encased in a shell of polymer, said shell being substantially proportional in size to the carbon center contained therein, which comprises treating carbon particles which have been thoroughly dried to a substantially anhydrous state with the components of a multi-component catalyst system the components of which, upon reaction with each other, form active sites of polymerization initiator effective for polymerizing 1-olefins, at least one of said components being present in an amount not substantially less than 0.06 and not substantially more than 2.4 millimoles per carbon particle gram, reacting said components in the presence of said carbon particle to form and affix on said particles active sites of polymerization initiator as said sites are formed by the reaction of said components and, thereafter, polymerizing an aliphatic 1-olefin containing less than 6 carbon atoms on said particles by bringing the catalyst treated particles with said active sites of polymerization initiator formed thereon into contact with said 1-olefin to polymerize said olefin on said carbon particles to form a shell of polymer on each of said particles of carbon, said shells being substantially proportional in size to the carbon particle contained therein.

References Cited by the Examiner

UNITED STATES PATENTS

| | | | |
|---|---|---|---|
| 2,512,697 | 6/1950 | Te Grotenhuis | 260—41.5 |
| 2,731,453 | 1/1956 | Field et al. | 260—41 |
| 2,824,089 | 2/1958 | Peters et al. | 260—88.2 |
| 2,834,768 | 5/1958 | Friedlander | 260—94.9 |
| 2,876,133 | 3/1959 | Iler et al. | 260—41 |
| 3,008,949 | 11/1961 | Langer et al. | 260—41 |
| 3,092,438 | 6/1963 | Kruger et al. | 260—41 |

FOREIGN PATENTS

| | | |
|---|---|---|
| 533,362 | 5/1955 | Belgium. |
| 549,466 | 1/1957 | Belgium. |
| 566,294 | 8/1957 | Italy. |

MORRIS LIEBMAN, *Primary Examiner.*

DANIEL ARNOLD, WILLIAM H. SHORT, *Examiners.*

E. F. McKINNEY, B. S. LEON, K. B. CLARKE,
*Assistant Examiners.*